Figure 1:
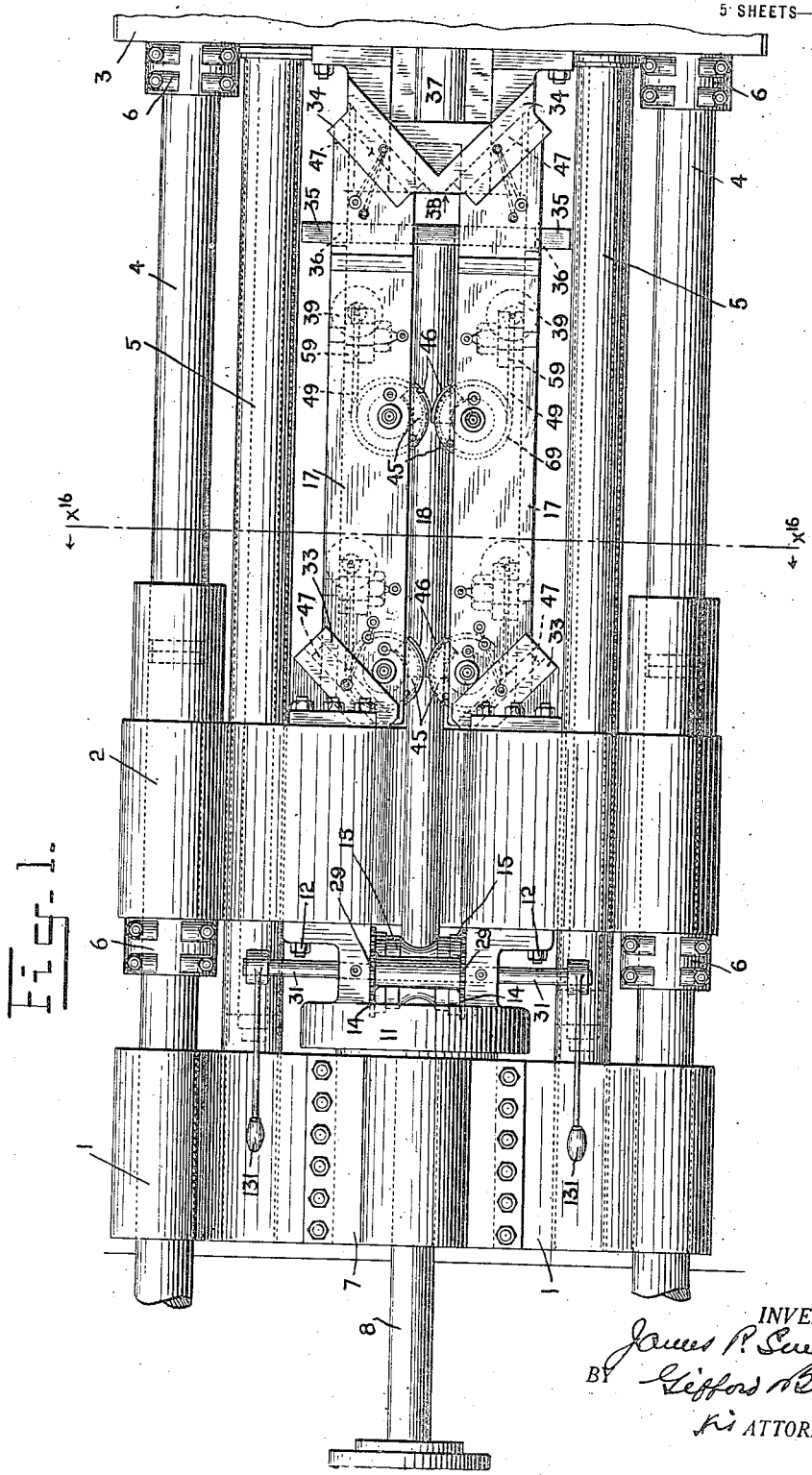

J. P. SNEDDON.
EXTRUSION PRESS FOR THE MANUFACTURE OF STEEL TUBES.
APPLICATION FILED JULY 27, 1918.

1,375,426.

Patented Apr. 19, 1921.

5 SHEETS—SHEET 1.

INVENTOR.
James P. Sneddon
BY Gifford Bull
his ATTORNEYS.

J. P. SNEDDON.
EXTRUSION PRESS FOR THE MANUFACTURE OF STEEL TUBES.
APPLICATION FILED JULY 27, 1918.
1,375,426.
Patented Apr. 19, 1921.
5 SHEETS—SHEET 2.
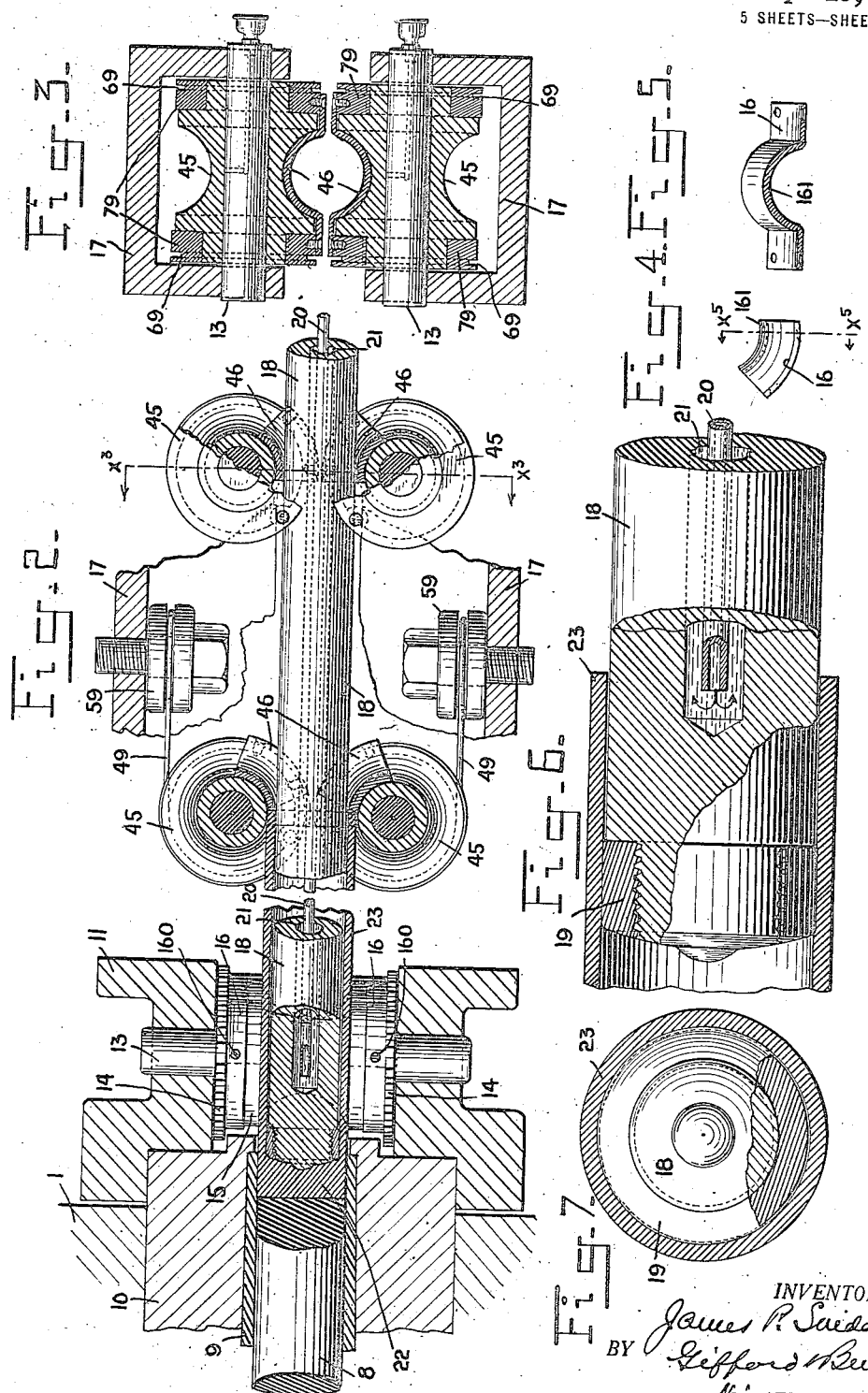
INVENTOR.
James P. Sneddon
BY Gifford Bull
His ATTORNEYS.

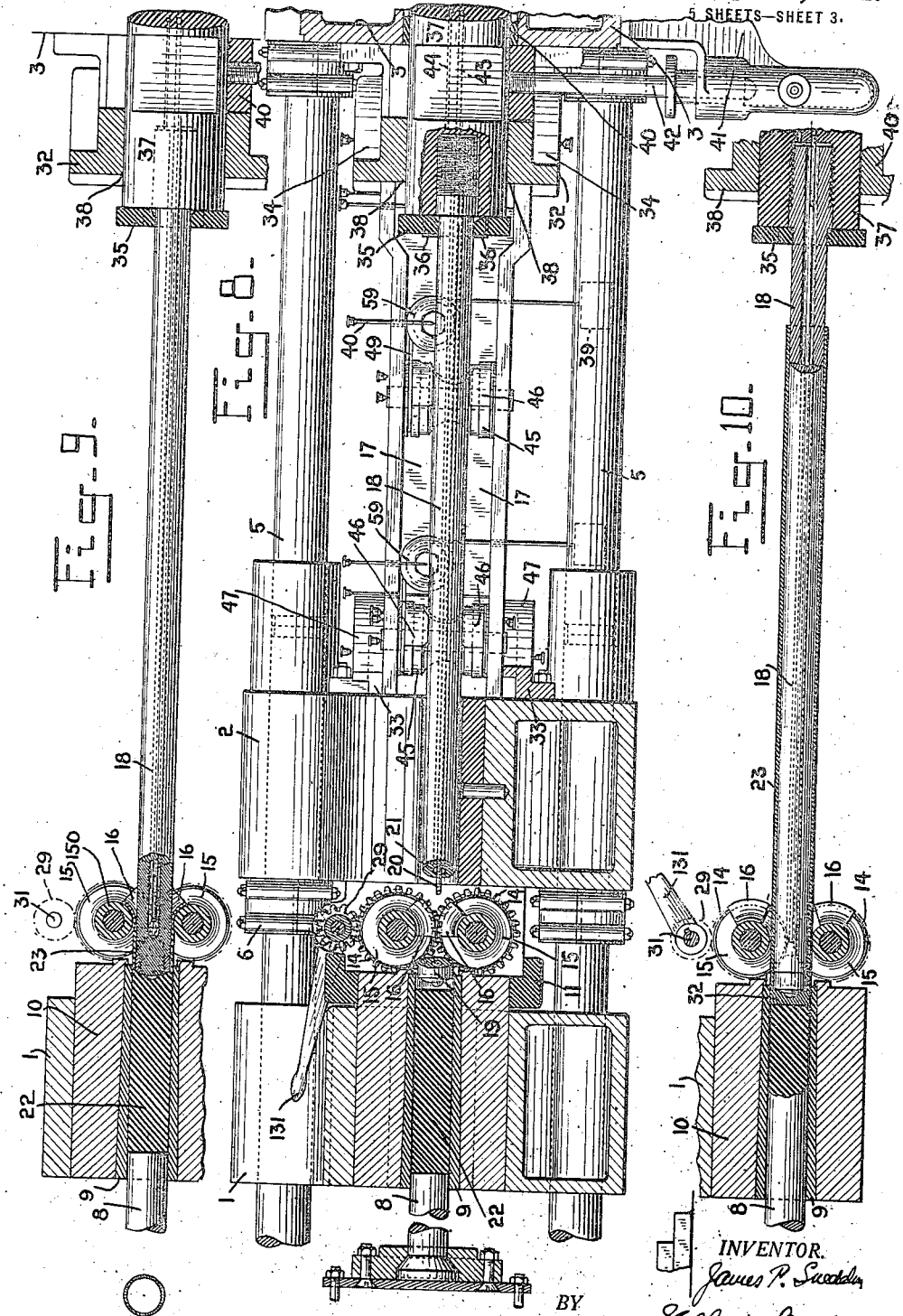

J. P. SNEDDON.
EXTRUSION PRESS FOR THE MANUFACTURE OF STEEL TUBES.
APPLICATION FILED JULY 27, 1918.
1,375,426.
Patented Apr. 19, 1921.
5 SHEETS—SHEET 4.
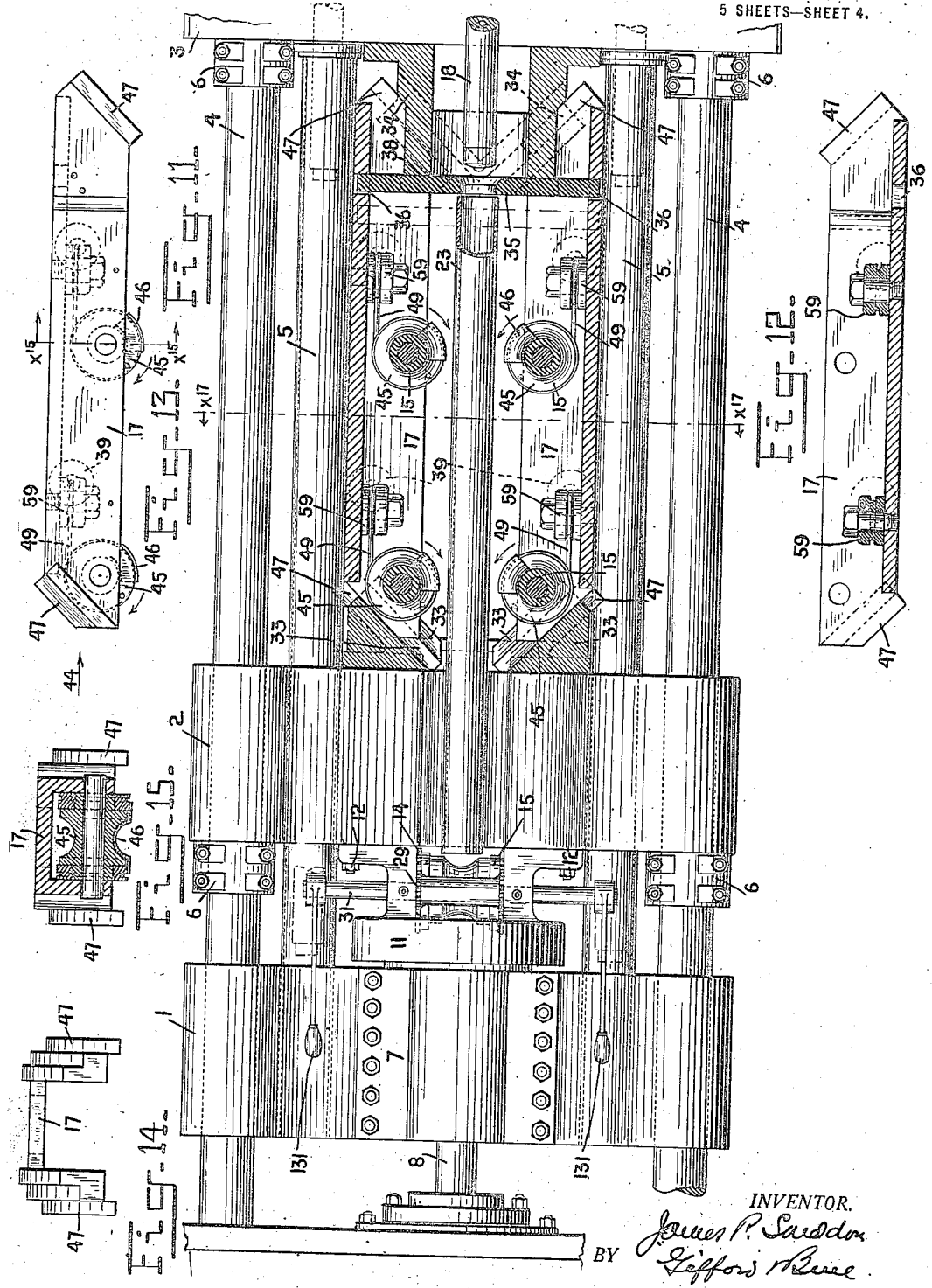
INVENTOR.
James P. Sneddon
BY Gifford Bull
his ATTORNEYS.

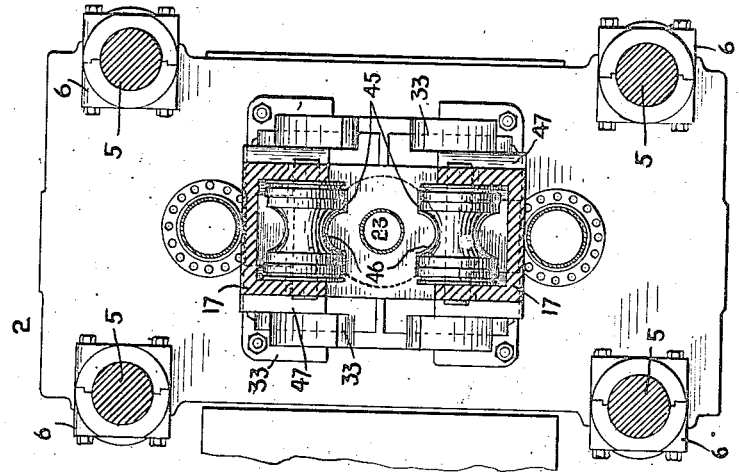
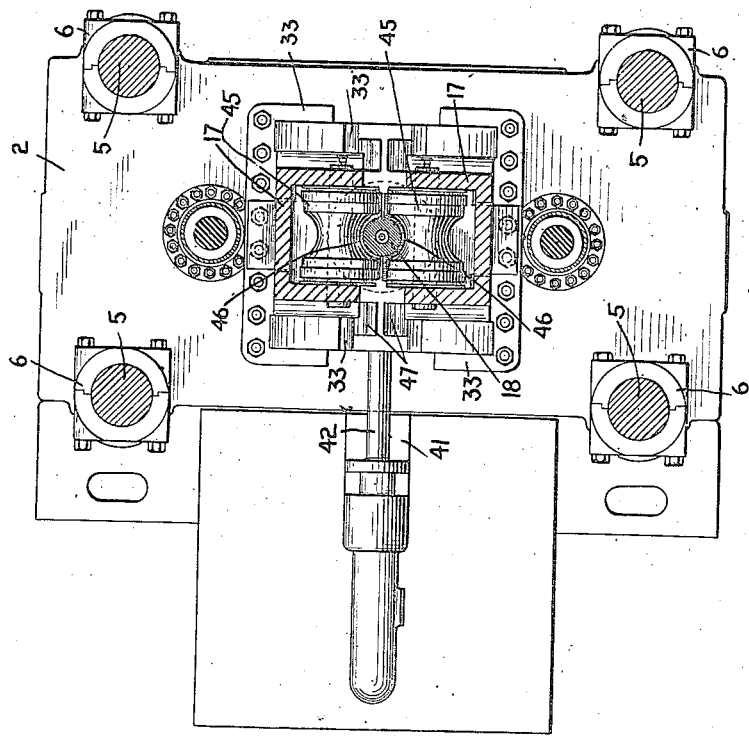

UNITED STATES PATENT OFFICE.

JAMES P. SNEDDON, OF BAYONNE, NEW JERSEY, ASSIGNOR TO THE BABCOCK & WILCOX COMPANY, OF BAYONNE, NEW JERSEY, A CORPORATION OF NEW JERSEY.

EXTRUSION-PRESS FOR THE MANUFACTURE OF STEEL TUBES.

1,375,426.

Specification of Letters Patent.   Patented Apr. 19, 1921.

Application filed July 27, 1918. Serial No. 246,977.

*To all whom it may concern:*

Be it known that I, JAMES P. SNEDDON, a citizen of the United States, residing at Bayonne, in the county of Hudson and State of New Jersey, have invented certain new and useful Improvements in Extrusion-Presses for the Manufacture of Steel Tubes, of which the following is a specification.

This invention relates to apparatus for the production of various articles by the extruding operation of a mandrel upon a blank of suitable material, and is of particular utility when embodied in an extrusion press of such special and powerful construction as to be capable of forcing a billet or blank consisting of solid preheated (or cold) steel cylinder of about 8 inches diameter, or a square plug, through an annular or similar opening in a suitable die, and over an inside mandrel, to form a long steel tube, or a box, of circular, oval, rectangular or other curved or polygonal cross-section, of about the same outside dimension as the blank, and having walls of about half an inch in thickness. It is to be understood, however, that I contemplate the use of my improvements in any field for which they may be adapted by their nature.

An important object of my invention is to provide novel means to enter, withdraw, center and guide the inside mandrel before and during extrusion of the blank, and also after formation of the tube or box, for the reason that the production by extrusion of such articles requires arrangements additional to those ordinarily employed, on account of the unusual power necessitated by the weight and proportions of the various instrumentalities, and the character of the billet or plug constituting the work piece in my improved extrusion apparatus.

Accordingly I have provided an improved extrusion press, having a mandrel and means to present a blank for treatment thereby, with novel means to support said mandrel and treated blank successively, said supporting means being constructed and arranged for emplacement in blank-supporting position by action thereupon of the advancing blank, and this emplacement is preferably automatic, the return of the supporting means to mandrel-supporting position being accomplished in suitable fashion, either automatically or as by a manually operated device.

Another important object of my invention is to provide for the automatic shifting of certain portions of the supporting means to position them at the appropriate intervals to support successively the mandrel and the extruded article as the latter advances from the region of extrusion, and I prefer to provide a plurality of sets of rolls for this purpose, each set being mounted in a frame slidingly mounted in the press and grouped about the axis of the mandrel, and each roll preferably having a filler segment or piece movable into and out of mandrel-engaging position, while each frame constitutes with its rolls a unitary structure constructed and arranged to be engaged and moved by the stripping plate usually provided in such presses, so that during stripping action the frames are shifted into appropriate position to release the mandrel and extruded article respectively. Counterweights may be provided for the return of the rolls and their filler segments to normal mandrel-supporting position prior to the advance of the mandrel to its working position adjacent to the region of extrusion.

Still another object of my invention is to provide means to control the temperature of the mandrel in its various positions, the principal function of this means being to provide a cooling fluid at the region of extrusion, and for this purpose I prefer to construct the mandrel with a fluid feed pipe lying within an axial bore of the mandrel, so that through this pipe cooling fluid may be passed to the head of the mandrel, whence it flows back through the bore to a suitable region for discharge.

The various features of my invention will be illustrated and described fully in the accompanying drawings and specification and pointed out in the claims.

In the drawings, Figure 1 is a view in plan of a press in the construction of which my improvements have been embodied; Fig. 2 is a fragmentary view in vertical section of Fig. 1, showing on an enlarged scale on the medial, longitudinal plane of the press, the principal parts used therein, parts being broken away to reveal the interior structure of other parts, and this figure illustrating in general the process of extrusion of a tube and the guiding of the mandrel and tube by guide rolls and filler segments; Fig. 3 is a vertical, sectional view of a set of guide rolls and their supporting frame, taken on the line $x^3-x^3$, Fig. 2, looking from right to left; Fig. 4 is a view in end elevation of one of the guide roll filler segments, taken separately; Fig. 5 is a sectional view on the line $x^5-x^5$ in Fig. 4; Fig. 6 shows on a larger scale in vertical, longitudinal section, partly in elevation, the extruding end of the madrel with its extra strong and replaceable head, and the means for cooling the mandrel by water delivered to the front by a supply pipe within the bore of the mandrel; Fig. 7 is a view in end elevation, partly in section, of the mandrel, which is shown surrounded by the extruded tube; Fig. 8 is a view in side elevation, partly in section, of the press, showing all the principal parts for extrusion of a tube from a block, ingot or billet of heated steel, constituting the blank or work piece. The parts are shown in position just before the beginning of extrusion; Fig. 9 is a fragmentary view, similar to Fig. 8, but with unnecessary parts omitted, illustrating the position of the parts and the work piece just after the beginning of the extrusion of the tube 23 from the solid steel cylinder or billet 22, at the stage when the front end of the extruded tube is pressed over the mandrel 18 and has entered the first set of guide rolls 15 and is beginning to shift the filler segment 16 out of its way to pass between the mandrel and the rolls 15, so that the rolls will continue to encircle, hold centrally and support the mandrel as the tube is formed over it; Fig. 10 shows the completed tube over the mandrel, this figure being similar to Fig. 9; Fig. 11 is a view similar to Fig. 1, but shows the last two parts of guide rollers separated from the extruded tube to make its removal possible. In this view the separating frames 17 with their guide rolls are shown in section and the mandrel 18 is shown withdrawn from the tube; Fig. 12 is a view in horizontal section of one of the separating frames 17, taken separately; Fig. 13 is a plan view of the other separating frame; Fig. 14 is a view in end elevation of the separating frame 17 taken in the direction of the arrow 44 in Fig. 13; Fig. 15 is a view in transverse section of the separating frame with guide roller and filling segment, taken on the line and in the direction $x^{15}-x^{15}$ in Fig. 13; Fig. 16 is a view in transverse vertical section on the line $x^{16}-x^{16}$ of Fig. 1, showing the mandrel 18 held by guide rolls 15; and Fig. 17 is a view in transverse vertical section on the line $x^{17}-x^{17}$ in Fig. 11, showing the guide rolls 15 with their filling segments 16 and frames 17, separated from the extruded tube 23.

In the embodiment of my invention selected for illustration and description to enable ready and complete understanding of my improvement, the parts designated by the reference characters 1, 2 and 3 are the head members of a press constructed and arranged to carry out the process of extruding tubes, and these heads, together with the connecting rods or members 4 and 5, and their clamping devices 6 and 7, may be of any suitable structure and material, as may also the actuating plunger 8, the die 9 and its surrounding block 10, and the other parts not herein described in detail, which in the instance illustrated are of such well-known character as to be familiar to those skilled in the art.

In accordance with an important feature of my invention I provide a mandrel 18 or piercing rod, unusually long and heavy to withstand the demands of extruding tubes from a solid block of metal, and for the same purpose I provide the mandrel with an extra strong and replaceable head 19, which is shown in Figs. 6 and 7 as a threaded ring screwed upon the mandrel 18. I prefer also to provide the mandrel with a pipe 20, extending forward within an axial bore 21 to a region near the head of the mandrel, so that fluid for regulating the temperature of the mandrel, as for example, water for cooling the same, may be introduced through the pipe 20 and flow back through the bore 21.

This mandrel may be in general of well-known or suitable construction, as illustrated, and provided with suitable actuating means to hold it up to its work as the plunger 8 forces the billet or work blank 22 against it, and also to withdraw the mandrel when the extrusion process has been carried out and has resulted in forming upon the mandrel a tube, long box or similar article 23 of circular, square, oval or any other desirable cross-section, according to the exigencies of the work to be formed, which will determine the cross-section of the mandrel 18 and the coöperating die 9, both of which are shown as circular in the instance selected for illustration.

The means for holding the mandrel up to its work, and for subsequently stripping it therefrom, may conveniently take the form of a hydraulic ram, the plunger of which is shown in Fig. 8 at 37, working through head 3 and carrying a stripping plate 35 which is capable of moving through a limited distance before it brings up against a stop face 38 upon the cylinder head 32, while the other parts of the ram, such as the cylinder 40 and its supporting structure 41, 42, etc., may be, and preferably are, of usual construction and arrangement, and are, therefore, not described in detail, but it will be noted that the plunger 37 of the ram has channels 43 and 44 to introduce and carry off the cooling fluid, they being in communication respectively with the pipe 20 and bore 21 of the mandrel for that purpose, as shown in dotted lines in Fig. 8.

Among the very important features of my invention is the provision of means to support firmly the mandrel along its working portion, prior to, and during, the extrusion of the tube or other work thereupon, and in accordance with this feature, I provide a series of devices to support the mandrel and the treated blank successively, so that the mandrel is held firmly against lateral displacement at the time of the impact of the blank 22 against its head 19, and as the work of extrusion proceeds, during the stage illustrated in Fig. 9, and on a larger scale in Fig. 2, the extruded tube is likewise received, and given support against lateral displacement, with the mandrel inclosed and supported within it.

Any suitable structure may be provided to accomplish this purpose, and as one convenient form of construction I have shown a pair of rolls 15 (best seen in Figs. 2 and 8) provided with filling segments 16 and carried in a frame 11 mounted between the heads 1 and 2, to the latter of which the frame is shown as bolted at 12, suitable journals 13 being provided, and suitable means 14, such as gears, to connect the rolls for co-rotation and thus to permit them to be operated manually, for which purpose I have shown a rock shaft 31 with operating handles 131 and a gear 29 engaged with the upper roll gears 14.

Brief reference has already been made to the filling segments 16, provided, one for each of the rolls 15, which constitute one convenient form of device to compensate for the difference in diameter between the periphery of the mandrel and the periphery of the tube 23 extruded thereupon, and while any suitable means may be adopted for this purpose, it will be readily understood that the segments 16 furnish means of simple, compact and inexpensive construction, readily secured in place, as by the screws 160, (see Fig. 2) and easily removed and replaced.

The filling segments 16 present the additional advantage of operating automatically under the action of the advancing end of the extruded tube 23 which engages with the hub portion 161 (see Figs. 4 and 5) of the segment in each case and rotates the segment 16 and its roll 15, so that as the segment turns out of the way its place is taken between the mandrel 18 and hub 161 of the roll by the wall of the extruded tube, the segment being of approximately the same thickness as the wall, and thus a firm support against lateral displacement is yielded, first as to the mandrel, and then to successive portions of the extruded tube as the latter advances along the mandrel.

I prefer to provide additional means of a similar character for this lateral support at recurrent regions of the tube and mandrel, and preferably at positions corresponding with the extent of protrusion of the tube beyond the rolls 15, and any suitable arrangement may be adopted for this purpose, one convenient arrangement being to provide additional pairs of rolls 45 carried by heavy cast steel frames 17 having flanges 47 mounted on slideways 33 and 34 set on the heads 2 and 3 at an angle of about 45° with the axis of the mandrel, so that the distance between the rolls 45 is determined by the location of the sliding frames longitudinally in the press.

This longitudinal movement of the frames 17 which carry the rolls 45 results from the engagement with the frames by the stripping plate 35, already mentioned as carried or operated by the ram 37, and which extends transversely across the press and passes through a rectangular finished hole 36 in each sliding frame, as best shown in Figs. 1 and 8.

The forward motion of the ram 37 which carries the extrusion mandrel 18 causes the flanges 47 to ride inward upon the slides 33 and 34 with a resultant motion of the frames forward and toward each other, bringing the rolls 45 into the supporting position described, and best seen upon reference to Figs. 1 and 2, the filling segments 46 occupying approximately the position shown, engaged with the mandrel 18, and ready for engagement by the forward end of the extruded tube, a position which preferably is maintained normally by action of a counterweight or plurality of counterweights 39 (see Figs. 2, 8 and 11) acting through belts 49 running about pulleys 59 to grooves 69 (see Fig. 3) in the peripheries of the pulleys 45, these grooves being formed in rings 79 carrying the filling segments 46 which rotate around the axes of the rolls 45. These rings and filling pieces are brought by means of the counterweights to a position, determined by stops 40, correct for supporting the bare mandrel, and when the end of the extruded tube pushes the filler pieces out of the way, these counterweights are raised.

There is no necessity for moving the filling segments 46 out of the way except to accommodate the extruded tube 23, because the hot blank does not require to pass these rolls. Therefore, no gear teeth and no hand lever are required to operate the rings on the rolls 45 which are mounted in the sliding frames 17, but the filling pieces 16 upon the rolls 15 adjacent to the region of extrusion must be moved manually out of the way of the hot blank or billet 22, which is of the same outside diameter as the extruded tube, and which must be thrust into the hollow die 9 when the mandrel 18 is brought forward into extruding position. When this is to be accomplished, the hand lever 131 is swung over to the right from the position shown in Fig. 11 and turns the rock shaft 31 and gears 29 and 14 to swing the filling segments 16 toward the right, clearing the space between the rolls for introduction of the blank 22 into the position shown in Fig. 8, the completed tube 23 shown in Fig. 11, having first been removed, after the mandrel 18 has been withdrawn therefrom through the stripping plate 35.

When the mandrel 18 is being withdrawn from the extruded tube 23 in stripping, the end of the extruded tube moves the stripping plate 35 through a limited distance until it brings up against the stop 38, and this motion causes the flanges 47 of the sliding frames 17 to move along the slideways 33 and 34, with the resultant effect of moving the sliding frames 17 apart until they are at the farthest point of their travel from the extrusion die 9, when they are separated sufficiently to allow the withdrawal of the extruded tube either from above or from below as shown in Fig. 11.

Accordingly, a complete cycle of operation of my improved extrusion press comprises the following steps, viz: Starting with the parts in the position shown in Fig. 11, and the completed tube 23 having been removed, the handle 131 is swung to the right to operate the gears 29, 14 and clear the segments 16 from their position in front of the die 9, and a blank 22 (see Fig. 8) of preheated or cold material such as steel, is introduced to the die 9 between the rollers 15 until it occupies the position shown in Fig. 8, after which the ram is operated to thrust its plunger 37 and the mandrel 18 forward, presenting the same in the position shown in Fig. 8 to extrude the material of the blank 22, for which purpose the latter is then thrust forward by the plunger 8, until the extruded cylindrical portion of the tube under formation reaches the position, shown in Fig. 9, for engagement with the swinging filling segments 16 carried by the rolls 15, which have up to that time occupied their normal position for support of the working end of the mandrel, the operator having brought the segments to this position by throwing the hand lever 131 over to the left after the blank 22 has been inserted.

A concurrent step comprises the approach of the swinging frame 17 toward the mandrel to bring the rollers 45 from the position shown in Fig. 11 into the position shown in Fig. 1 to support the mandrel 18 at the desired points along its length, and this approaching movement is caused by the leftward movement of the stripping plate 35, under the action of the mandrel 18 and ram-plunger 37, which pushes the frames 17 toward the extrusion region causing their flanges 47 to ride inward upon the slideways 33 and 34, bringing the rolls 45 into the position shown in Fig. 1, after which the movement of the plunger 8 continues extruding the blank 22 over the mandrel end 19 until the tube has been completed, the tube 23 advancing, as it is formed, between the rollers 45 of the frames 17, pushing out of its way successively the filling segments 46 (see Fig. 2) against the action of the counterweights 39.

Fig. 10 shows the completed tube 23 over the mandrel 18, and usually there will remain a small end piece 32 which may with advantage form the end closing of the tube or header later formed from it.

The final step comprises the withdrawal of the ram plunger 37 with the mandrel 18, bringing the tube 23 to the position shown in Fig. 11, during which step the stripping plate 35 retracts the frames 17, whose flanges 47 ride up on the slideways 33 and 34 and bring the rollers 45 into the separated position of Fig. 11 where they are free to permit the counterweights 39 to turn the filling segments 46 into the position there shown, ready for engagement with the bare mandrel 18 at the initiation of the next extruding operation.

Having illustrated and described my invention thus fully, and suitable means by which the same may be carried into effect, I wish it to be understood that I do not limit myself to the specific materials and details of construction selected for illustration and description, nor in general do I limit myself otherwise than as set forth in the claims, read in connection with this specification.

What I claim as new and desire to secure by Letters Patent is:—

1. In a press of the class described, comprising a mandrel and means to present a blank for treatment thereby, means to support said mandrel and treated blank successively, said supporting means being constructed and arranged to be moved to blank-supporting position by action thereupon of the advancing blank.

2. In a press of the class described, comprising a mandrel and means to present a blank for treatment thereby, means to support said mandrel and treated blank successively, said blank-supporting means being constructed and arranged to be moved to blank-supporting position by action thereupon of the advancing blank upon the mandrel-supporting means.

3. In a press of the class described, comprising a mandrel and means to present a blank for treatment thereby, means to support said mandrel and treated blank successively, said supporting means being constructed and arranged for emplacement in blank-supporting position by action thereupon of the advancing blank, and means to return said supporting means to mandrel-supporting position.

4. In a press of the class described, comprising a mandrel and means to present a blank for treatment thereby, means to support said mandrel and treated blank successively, said supporting means being constructed and arranged for emplacement in blank-supporting position automatically by action thereupon of the advancing blank, and means operable manually to return said supporting means to mandrel-supporting position.

5. In a press of the class described, a mandrel, means to present a blank for treatment thereby, and means to support said mandrel and treated blank successively, said supporting means comprising a roll having a member movable into position to support said mandrel.

6. In a press of the class described, a mandrel, means to present a blank for treatment thereby, and means to support said mandrel and treated blank successively, said supporting means comprising a roll having a member movable into position to support said mandrel, and into another retracted position to support said treated blank and mandrel in proper alinement.

7. In a press of the class described, a mandrel, means to present a blank for treatment thereby, means to support said mandrel and treated blank successively, said supporting means comprising a plurality of rolls arranged co-axially about said mandrel and having each a filler-piece to support said mandrel, said filler-pieces being arranged for coördinated movement under the displacing action of the advancing work-blank.

8. In a press of the class described, a mandrel, means to present a blank for treatment thereby, means to support said mandrel and treated blank successively, said supporting means comprising a plurality of rolls arranged co-axially about said mandrel and having each a filler-piece to support said mandrel, said filler-pieces being arranged for coördinated movement under the displacing action of the advancing work-blank and mechanism for manually positioning said filler-pieces.

9. In a press of the class described, a mandrel, means to present a blank for treatment thereby, means to support said mandrel and treated blank successively, said supporting means comprising a plurality of rolls arranged co-axially about said mandrel and having each a removable filler-segment to support said mandrel, said filler-segments being connected for coördinated movement under the displacing action of the advancing work-blank, and mechanism for manually positioning said filler-segments.

10. In a press of the class described, a mandrel, means to present a blank for treatment thereby, means to advance and retract said mandrel, and means to support said mandrel and treated blank successively, said supporting means being operable by the advancing movement of said mandrel-actuating means to approach said mandrel for lateral support thereof, and being operable by retractive movement of said mandrel-actuating means to clear said mandrel and the completed work thereupon.

11. In a press of the class described, a mandrel, means to present a blank for treatment thereby, means to advance and retract said mandrel, and means to support said mandrel and treated blank successively, said supporting means being operable by the advancing movement of said mandrel-actuating means to clear said mandrel and the completed work thereupon, and said supporting means comprising a plurality of rolls provided respectively with filling segments constructed and arranged to be engaged with said mandrel for support thereof prior to the advance of the extruded article, said filling segments being arranged to be moved by the advancing work into position to support the latter upon said mandrel.

12. In a press of the class described, a mandrel, means to present a blank for treatment thereby, a frame upon which said instrumentalities are mounted and having slideways, work-supporting means comprising frames mounted slideably upon said slideways and having work-supporting rolls arranged co-axially about said mandrel, a ram to operate said mandrel, and a stripping device for removal of the work from said mandrel, said stripping device being constructed and arranged to cause approach of said frames toward said mandrel upon advance thereof, and to withdraw said frames upon retraction of said mandrel.

13. An extrusion press for making hollow blanks or articles, having a mandrel and a guide system contacting with and holding the mandrel in alinement before the extruded metal reaches it, said guide system having retractable parts and being arranged to contact with and hold the extruded metal and mandrel in alinement after said extruded metal reaches said guide system.

14. An extrusion press for making hollow blanks or articles, having a mandrel and a guide system contacting with and holding the mandrel in alinement before the extruded metal reaches it, said guide system having automatically retractable parts engaged by the extruded metal to retract them and being arranged to contact with and hold the extruded metal and mandrel in alinement after said extruded metal reaches said guide system.

15. An extrusion press for making hollow blanks or articles, having an endwise movable mandrel, a rotary guide system contacting with and holding the mandrel in alinement before the extruded metal reaches it, said system being retractable and arranged to contact with and be rotated by the extruded metal and hold the same and the mandrel in alinement.

16. An extrusion press for making hollow blanks or articles, having a mandrel and a guide system contacting with and holding the mandrel in alinement before the extruded metal reaches it, said guide system having retractable parts and being arranged to contact with and hold the extruded metal and mandrel in alinement after said extruded metal reaches said guide system, and manually controlled means for retracting parts of the guide system.

17. An extrusion press for making hollow blanks for articles, having a mandrel and a guide system contacting with and holding the mandrel in alinement before the extruded metal reaches it, said guide system having retractable parts and being arranged to contact with and hold the extruded metal and mandrel in alinement after said extruded metal reaches said guide system, and means for moving parts of the guide system out of operative position to allow removal of the extruded article.

18. A method of operating an extrusion press which consists of first moving a mandrel against the end of a billet, then forcing the metal of the billet over the mandrel in a direction opposite to the first motion of the mandrel, supporting the end of the mandrel as it is moved toward the billet, and removing the support by the flow of the extruded metal.

In testimony whereof I have hereunto signed my name in the presence of two subscribing witnesses.

JAMES P. SNEDDON.

Witnesses:
EDWARD A. BANNON,
M. E. HAMLIN.